United States Patent
Haas

[11] Patent Number: 5,855,047
[45] Date of Patent: Jan. 5, 1999

[54] BELT BUCKLE WITH FASTENER FITTING

[75] Inventor: Peter Haas, Göggingen, Germany

[73] Assignee: TRW Occupant Restraint Systems GmbH, Alfdorf, Germany

[21] Appl. No.: 6,940

[22] Filed: Jan. 14, 1998

[30] Foreign Application Priority Data

Jan. 20, 1997 [DE] Germany ............... 297 00 908 U

[51] Int. Cl.⁶ ............... B60R 22/20; A44B 11/00
[52] U.S. Cl. ............... 24/684; 280/801.1; 297/468
[58] Field of Search .................. 24/684, 682.2, 24/323, 639; 297/482, 473, 468, 481; 280/801.1, 801.2, 808

[56] References Cited

U.S. PATENT DOCUMENTS

| | | | |
|---|---|---|---|
| 4,132,434 | 1/1979 | Takahashi et al. | 280/801.1 |
| 4,611,854 | 9/1986 | Pfeiffer | 297/468 |
| 4,638,534 | 1/1987 | Sasaki et al. | 24/684 X |
| 4,645,232 | 2/1987 | Hamada et al. | 280/801.1 |
| 4,890,951 | 1/1990 | Morinaga et al. | 297/468 X |
| 4,928,992 | 5/1990 | Qvint et al. | 297/468 |
| 5,064,220 | 11/1991 | Ogawa . | |
| 5,236,220 | 8/1993 | Mills . | |

FOREIGN PATENT DOCUMENTS

| | | |
|---|---|---|
| 0004485 | 10/1979 | European Pat. Off. . |
| 8812887 | 11/1988 | Germany . |
| 4020365 | 1/1991 | Germany . |
| 2201329 | 9/1988 | United Kingdom . |

*Primary Examiner*—James R. Brittain
*Assistant Examiner*—Robert J. Sandy
*Attorney, Agent, or Firm*—Tarolli, Sundheim, Covell, Tummino & Szabo

[57] ABSTRACT

A belt buckle with a fastener fitting for vehicle-fixed mounting comprising a carrier plate fixedly connected to the belt buckle. The carrier plate being connected to the fastener fitting. The carrier plate includes an opening by which the carrier plate is mounted rotatably on a pin extending through the opening and fixed to the fastener fitting. A return element is provided which urges the belt buckle relative to the fastener fitting rotationally about the centerline of the pin and rotationally about an axis perpendicular to the centerline of the pin and to the longitudinal axis of the belt buckle into a resting position. For the belt buckle being, for one thing, movable with respect to the fastener fitting, so that it can either be oriented at any time in a position optimal for the function or it permits being moved from a temporarily unwanted position, and for another, the belt buckle automatically returned after such a maladjustment into a resting position which is optimal for introducing the insert tongue into the belt buckle, the opening in the carrier plate is an elongated hole, the longitudinal axis which is roughly parallel to the longitudinal axis of the belt buckle, and the return element further urges the belt buckle into a resting position relative to the fastener fitting translationally in a direction parallel to the longitudinal axis of the belt buckle.

9 Claims, 2 Drawing Sheets

BELT BUCKLE WITH FASTENER FITTING

BACKGROUND OF THE INVENTION

The invention relates to a belt buckle with fastener fitting for vehicle-fixed mounting comprising a carrier plate fixedly connected to said belt buckle, said carrier plate being connected to said fastener fitting, wherein the carrier plate includes an opening by means of which the carrier plate is mounted rotatably on a pin fixed to the fastener fitting, and wherein a return means is provided which urges the belt buckle relative to the fastener fitting rotationally about the centerline of the pin and rotationally about an axis perpendicular to the centerline of the pin and to the longitudinal axis of the belt buckle into a resting position.

Together with the fastener fitting the belt buckle forms an assembly known in general in the field of vehicle occupant restraint systems. The belt buckle serves to receive an insert tongue shiftingly applied to a seat belt for buckling up a vehicle occupant. The fastener fitting serves to attach the belt buckle fixedly to the vehicle, for example, to a vehicle seat or to the vehicle body. Usually, a wire cable portion is used to connect the belt buckle to the fastener fitting.

U.S. Pat. No. 4,638,534 shows a belt buckle with fastener fitting for vehicle-fixed mounting which comprises a carrier plate fixedly connected to said belt buckle, said carrier plate being connected to said fastener fitting. The carrier plate includes an opening by means of which the carrier plate is mounted rotatably on a pin fixed to the fastener fitting. A helical spring is provided which urges the belt buckle relative to the fastener fitting rotationally about the centerline of the pin and rotationally about an axis perpendicular to the centerline of the pin and to the longitudinal axis of the belt buckle into a resting position. In case a vehicle occupant sits down on the belt buckle, the belt buckle can therefore only give way in two directions.

U.S. Pat. No. 4,132,434 shows a belt buckle with fastener fitting which is mounted to a vehicle seat. A pin is fixed to the fastener fitting and comprises, on its end facing away from the fastener fitting, a ball shaped end. A carrier plate of the belt buckle surrounds by means of a correspondingly shaped recess and a holding part said ball shaped end of the pin, thereby forming a ball-joint. A helical spring is provided, to urge the belt buckle relative to the fastener fitting about the axes of the ball-joint into a resting position.

A belt buckle with fastener fitting, which is fixed to a vehicle seat, is also described in U.S. Pat. No. 4,451,087. The belt buckle comprises a carrier plate, which is mounted rotatably on a pin fixed to the fastener fitting. To limit the extent of rotational movement of the carrier plate, a stop means is provided. The stop means consists of a finger portion of the carrier plate which extends into an elongated hole of the fastener fitting.

U.S. Pat. No. 4,222,610 describes a belt buckle which is secured to a vehicle door. The carrier plate of the belt buckle is divided in two parts, a first one being fixed to the vehicle door and a second one being connected to the belt buckle. The first and the second parts of the carrier plate are connected by a hinge. The belt buckle is rotatably mounted to the second part of the carrier plate by means of a pin.

U.S. Pat. No. 4,536,010 shows a deflector fitting, rotatably mounted to a fastener fitting. The deflector fitting is connected to fastener fitting by means of a pin and is urged into a resting position by a helical spring.

One requirement on such a belt buckle involves it being, for one thing, movable with respect to the fastener fitting, so that it can either be oriented at any time in a position optimal for the function or it permits being moved from a temporarily unwanted position, and for another, the belt buckle being automatically returned after such a maladjustment into a resting position which is optimal for introducing the insert tongue into the belt buckle.

SUMMARY OF THE INVENTION

For this purpose it is provided for in a belt buckle of the aforementioned kind in accordance with the invention that the opening in the carrier plate is an elongated hole the longitudinal axis of which is roughly parallel to the longitudinal axis of the belt buckle and that the return means urges the belt buckle into a resting position relative to the fastener fitting translationally in a direction parallel to the longitudinal axis of the belt buckle. By the invention a belt buckle is thus defined which can be moved out of a resting position to e.g. adapt to an optimum run of the belt webbing of an insert tongue introduced into the belt buckle or which can be hinged in reverse to enable a rear seat bench to be hinged open. Once the belt buckle has been released it automatically reverts to its resting position. Together with the return means, guiding the belt buckle on the pin results in a much more precised positioning of the belt buckle and a much greater resetting action than in the case of a belt buckle held by a wire cable portion. As a result of the invention excellent mobility of the belt buckle relative to the fastener fitting materializes in three directions of movement. By suitably attaching the fastener fitting relative to the vehicle it can be achieved by means of these three possible directions of movement that the belt buckle is suitably movable for any conceivable case necessitating its resting position to be abandoned. A translatory movement of the belt buckle in a direction parallel to the longitudinal axis of the belt buckle enables the belt buckle to dive by a few centimeters when, for instance, a vehicle occupant sits down on the belt buckle, this being particularly relevant to belt buckles fitted to a rear seat bench. A rotational movement about the centerline of the pin enables the belt buckle to swivel in the fashion as aforementioned, more particularly, in the longitudinal direction of the vehicle. A rotational movement about an axis perpendicular to the centerline of the pin and to the longitudinal axis of the belt buckle enables the belt buckle to swivel transversely to the forward direction in both directions so as to adapt itself to the run of the seat belt. One special advantage of the invention lies in the fact that a single return means is sufficient to reset the belt buckle into its resting position following a movement in the three possible directions of movement, thus providing maximum possible convenience for minimum expense in production.

In accordance with the preferred embodiment of the invention it is provided for that the return means is a wire spring. In this way the return means can be produced particularly cost-effectively.

It is preferably provided for that the spring comprises a first spiral portion arranged on the pin and a second spiral portion arranged between said first spiral portion and the end of the spring supported by the belt buckle. This configuration produces a particularly large range of movement permitted by the spring. Furthermore, the return action of the spring is made available for each and every eligible movement of the belt buckle relative to the fastener fitting irrespective of the return action provided for other movements.

BRIEF DESCRIPTION OF THE DRAWINGS

The invention will now be explained on the basis of preferred embodiments as illustrated in the mounted drawings, in which.

DESCRIPTION OF THE PREFERRED EMBODIMENTS

Figure 1:
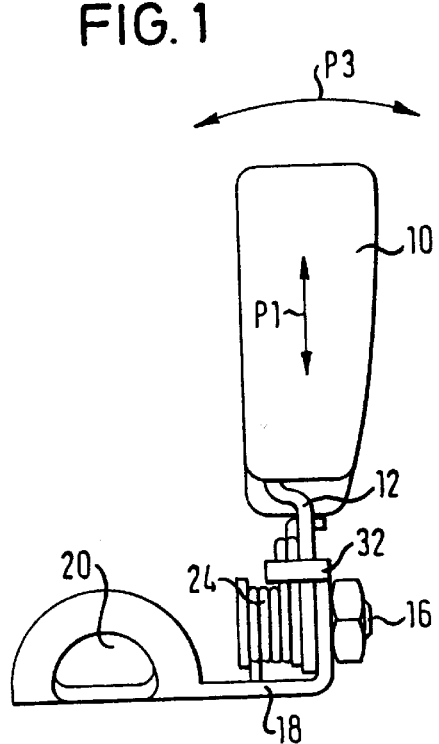
FIG. 1 is a side view of a belt buckle in accordance with the invention comprising a fastener fitting in accordance with a first embodiment.
Figure 2:
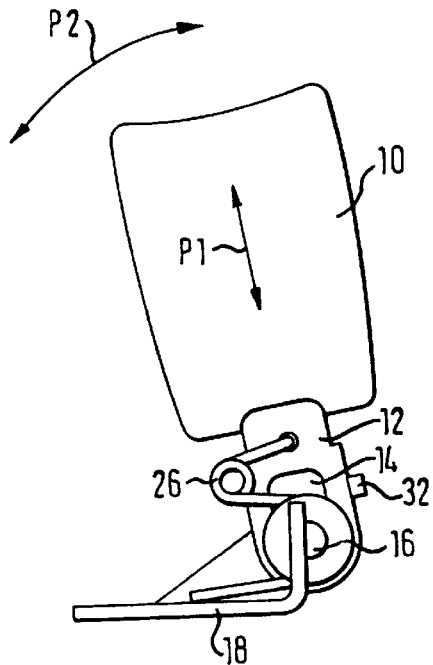
FIG. 2 shows the belt buckle with the fastener fitting of FIG. 1 in a further side view.
Figure 3:
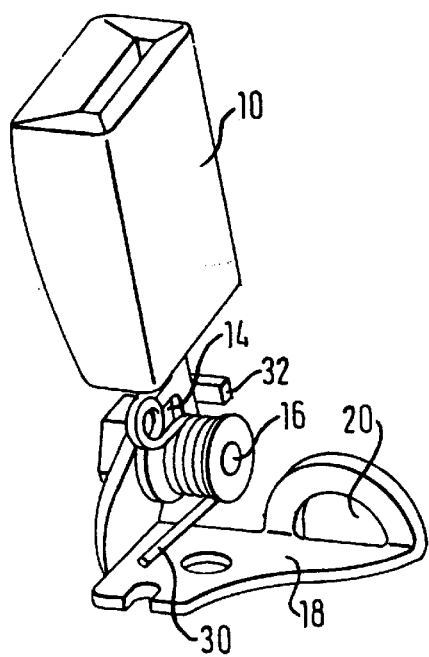
FIG. 3 is a perspective view of the belt buckle with the fastener fitting of FIG. 1.

In the FIGS. 1 to 3 a belt buckle having a fastener fitting in accordance with a first embodiment of the invention is illustrated. The belt buckle identified by the reference numeral 10 comprises a carrier plate 12 provided with an elongated hole 14 at its free end spaced away from the belt buckle 10. Engaging the elongated hole 14 is a pin 16 which is connected to a fastener fitting 18. The fastener fitting 18 serves to mount the belt buckle 10 fixedly on the vehicle, it including for this purpose a fastener opening 20. Mounted to the fastener pin 16 is a spring 22 which is is shown in detail in FIG. 4.

The spring 22 is a wire spring and comprises a first spiral portion 24 arranged on the fastener pin 16, and a second spiral portion 26 arranged between the first spiral portion 24 and a free end 28 of the spring, this end engaging the carrier plate 12. The other free end 30 of the spring 22 is supported by the fastener fitting 18.

The belt buckle 10 is able to move relative to the fastener fitting 18 in three directions: for one thing a translatory movement of the belt buckle 10 in a direction parallel to the longitudinal axis of the belt buckle is possible, i.e. in the direction of the double arrow P1. This movement is possible by the elongated hole 14 shifting on the pin 16. Furthermore, a rotational movement about the centerline of the pin is possible, i.e. in the direction of the double arrow P2. This movement occurs due to rotation of the carrier plate 12 on the fastener pin 16. In conclusion, a rotational movement about an axis is possible which is perpendicular to the centerline of the pin and perpendicular to the longitudinal axis of the belt buckle, i.e. in the direction of the double arrow P3. This movement is possible due to the carrier plate 12 tilting on the pin 16 from a position perpendicular to the centerline of the pin 16.

When the belt buckle 10 moves relative to the fastener fitting 18 in any of the directions P1, P2 and P3 the belt buckle 10 is reset by the spring 22 into the resting position illustrated in FIGS. 1 to 3. When a movement occurs in the direction of the arrow P1 the return action is provided by the second spiral portion 26 of the spring 22. The resting position is defined in this direction of movement by the pin 16 contacting the end of the elongated hole 14 remote from the belt buckle 10. When a movement occurs in the direction of the arrow P2 the return action is provided by the first spiral portion 24 which in the case of such a movement is exposed to a rotation about the centerline of the pin 16. For movements along the direction of the arrow P2 the resting position is defined by a stop 32 provided on the fastener fitting 18. For movements along the direction of the arrow P3 the resting position is likewise provided by the first spiral portion 24. Contrary to movements in the direction of the arrow P2 the first spiral portion 24 is not rotated about the centerline of the pin 16 in the case of movements in the direction of the arrow P3, it is instead compressed in a direction perpendicular to the centerline. For a movement of the belt buckle 10 in the direction of the arrow P3, i.e. axially with respect to the pin 16 the first spiral portion 24 is compressed. For a suitable return action it is thus substantial in the case of movements in the direction of the arrow P3 that the first spiral portion 24 is pretensioned between—with respect to FIG. 1—left end of the pin 16 and the carrier plate 12, but that the windings of the first spiral portion 24 are still to come into contact with each other when the belt buckle is in the resting position. For movements in the direction of the arrow P3 the resting position of the belt buckle 10 is defined by surface area contact of the portion of the carrier plate 12 surrounding the elongated hole 14 with the portion of the fastener fitting 18 surrounding the pin 16.

Figure 5:
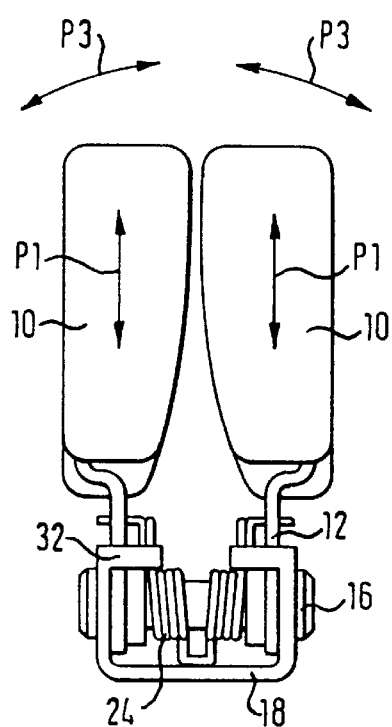
FIG. 5 is a side view of a belt buckle in accordance with the invention with the fastener fitting in accordance with a second embodiment of the invention.
Figure 6:
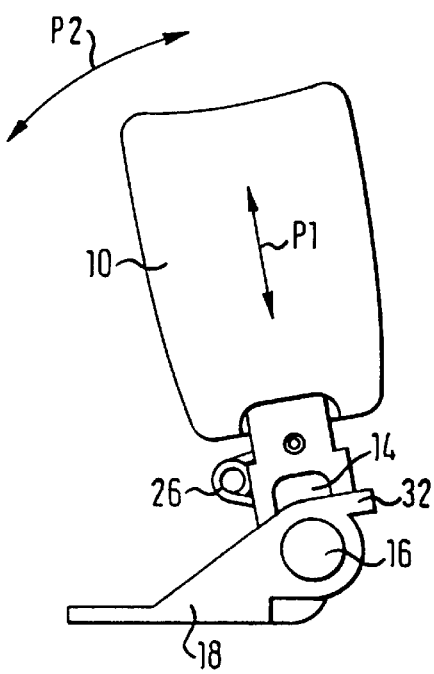
FIG. 6 shows the belt buckle with the fastener fitting of FIG. 5 in a further side view.
Figure 7:
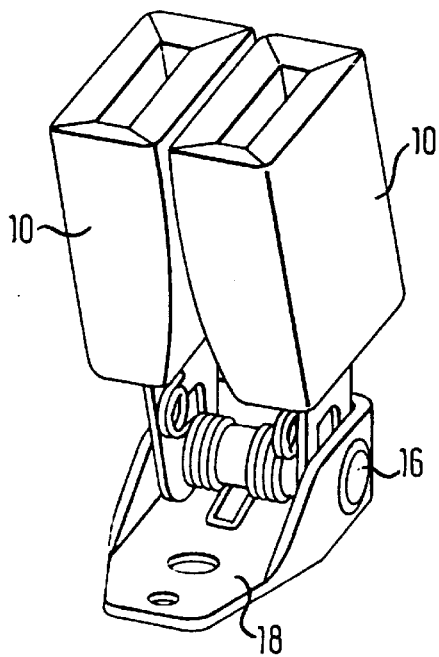
FIG. 7 is a perspective view of the belt buckle with the fastener fitting of FIG. 5.

Illustrated in the FIGS. 5 to 7 is a second embodiment of the invention. Elements of this embodiment, known from the first embodiment, are identified by identical reference numerals and reference is made to the above explanations as regards their function. In the following only the differences of the second embodiment as compared to the first embodiment are explained.

Figure 4:
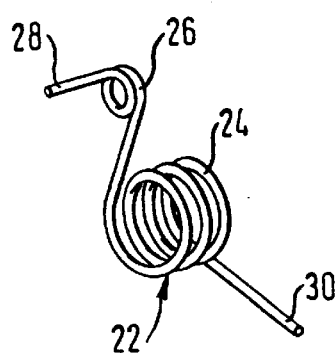
FIG. 4 is a perspective view showing the spring used in the case of the belt buckle with the fastener fitting of FIG. 1.
Figure 8:
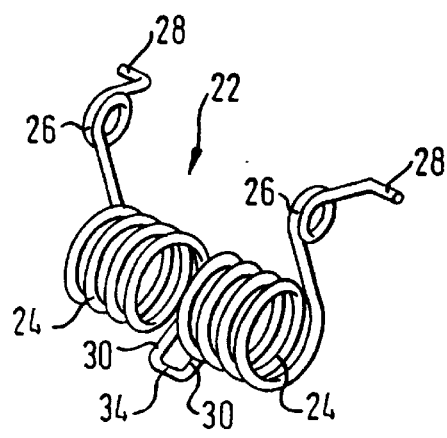
FIG. 8 shows the spring used in the case of the belt buckle with the fastener fitting of FIG. 5.

Contrary to the first embodiment it is provided for in the case of the second embodiment that two belt buckles 10 are assigned a single fastener fitting 18. The two carrier plates 12 of the belt buckles 10 are arranged on one and the same pin 16. Between the two carrier plates 12 the spring 22 is disposed which is shown in detail in FIG.8. The difference to the spring illustrated in FIG. 4 consists of the two free ends 30 of each spring provided for a belt buckle 10 are connected to each other by a middle web 34. The only difference in the action of the spring shown in FIG. 8 as compared to the spring shown in FIG.4 is that for movements of the belt buckle 10 the first spiral portion 24 is not supported by an enlarged end of the pin 16, it is instead supported by the free end 30 on the fastener fitting 18 and, should the friction force be overcome at this location, via the first spiral portion 24 of the other belt buckle by the carrier plate 12 thereof.

I claim:

1. A belt buckle with a fastener fitting for vehicle-fixed mounting, comprising a carrier plate fixedly connected to said belt buckle, said carrier plate being connected to said fastener fitting, wherein said carrier plate includes an opening by which said carrier plate is mounted rotatably on a pin extending through said opening and fixed to said fastener fitting, wherein a return means is provided which urges said belt buckle relative to said fastener fitting rotationally about a centerline of said pin and rotationally about an axis perpendicular to the centerline of said pin and to a longitudinal axis of said belt buckle into a resting position, wherein said opening in said carrier plate is an elongated hole, having a longitudinal axis which is substantially parallel to the longitudinal axis of said belt buckle and wherein said return means urges said belt buckle into a resting position relative to said fastener fitting translationally in a direction parallel to the longitudinal axis of said belt buckle.

2. The belt buckle as set forth in claim 1, wherein said return means is a wire spring.

3. The belt buckle as set forth in claim 2, wherein said wire spring comprises a first spiral portion arranged on said pin, and a second spiral portion arranged between said first spiral portion and one end of said wire spring, said one end being supported by said belt buckle.

4. The belt buckle according to claim 3, wherein said resting position of said belt buckle is defined by one end of said elongated hole with respect to translational movement of said belt buckle.

5. The belt buckle according to claim 4, wherein said resting position of said belt buckle is defined by a stop on said fastener fitting with respect to rotational movement about the centerline of said pin.

6. The belt buckle according to claim 5, wherein with respect to rotational movement about the axis perpendicular to the centerline of said pin and to the longitudinal axis of said belt buckle, said resting position of said belt buckle is defined by surface area contact of a portion of said carrier plate surrounding said elongated hole with said fastener fitting.

7. The belt buckle as set forth in claim 1, wherein said resting position of said belt buckle is defined by one end of said elongated hole with respect to translational movement of said belt buckle.

8. The belt buckle as set forth in claim 1, wherein said resting position of said belt buckle is defined by a stop on said fastener fitting with respect to rotational movement about the centerline of said pin.

9. The belt buckle as set forth in claim 1, wherein with respect to rotational movement about the axis perpendicular to the centerline of said pin and to the longitudinal axis of said belt buckle, said resting position of said belt buckle is defined by surface area contact of a portion of said carrier plate surrounding said elongated hole with said fastener fitting.

* * * * *